US007796001B2

(12) United States Patent
Žežulka et al.

(10) Patent No.: US 7,796,001 B2
(45) Date of Patent: Sep. 14, 2010

(54) METHOD OF FORMING MAGNETIC BLOCKS AND EQUIPMENT FOR CARRYING OUT THAT METHOD

(75) Inventors: Václav Žežulka, Mníšek pod Brdy (CZ); Pavel Straka, Praha 9 (CZ); Václav Soukup, Strakonice (CZ)

(73) Assignee: Ustav Struktury A Mechaniky Hornin AV CR, V.V.I., Prague (CZ)

( * ) Notice: Subject to any disclaimer, the term of this patent is extended or adjusted under 35 U.S.C. 154(b) by 103 days.

(21) Appl. No.: 12/087,008

(22) PCT Filed: Jul. 18, 2007

(86) PCT No.: PCT/CZ2007/000071

§ 371 (c)(1),
(2), (4) Date: Oct. 27, 2008

(87) PCT Pub. No.: WO2008/009242

PCT Pub. Date: Jan. 24, 2008

(65) Prior Publication Data

US 2010/0052833 A1 Mar. 4, 2010

(51) Int. Cl.

| | |
|---|---|
| ***H01F 7/00*** | (2006.01) |
| ***H01F 1/00*** | (2006.01) |
| ***H01F 3/00*** | (2006.01) |
| ***H01F 7/02*** | (2006.01) |
| ***B01D 35/06*** | (2006.01) |
| ***B01D 35/00*** | (2006.01) |
| ***B01D 35/14*** | (2006.01) |
| ***B03C 1/02*** | (2006.01) |
| ***B03C 1/30*** | (2006.01) |
| ***C02F 1/48*** | (2006.01) |

(52) U.S. Cl. ........................ 335/219; 335/296; 335/297; 335/298; 335/302; 335/303; 335/306; 210/94; 210/95; 210/222; 210/223; 210/695

(58) Field of Classification Search ................. 335/219, 335/285, 296, 297, 298, 302, 303, 306; 210/94, 210/95, 222, 223, 695; 123/536, 537, 538, 123/539; 184/6.25
See application file for complete search history.

(56) References Cited

U.S. PATENT DOCUMENTS 4,390,423 A * 6/1983 Sundt ......................... 210/222
4,935,133 A 6/1990 Hirama

OTHER PUBLICATIONS

International Preliminary Report on Patentability & Written Opinion dated Jan. 20, 2009.

(Continued)

*Primary Examiner*—Lincoln Donovan
*Assistant Examiner*—Mohamad A Musleh
(74) *Attorney, Agent, or Firm*—Buchanan Ingersoll & Rooney, PC

(57) ABSTRACT

In forming magnetic blocks, a first permanent magnet may be lowered to the bottom of an upwardly open vessel, the vessel may be already filled or may be then filled with liquid and, while forcefully maintaining the first permanent magnet in that position, further permanent magnets are gradually inserted into the vessel in a direction perpendicular to their resulting joint contact surfaces, where the adjacent surfaces of the superimposed permanent magnets have an opposite polarity, while during insertion of a further permanent magnet, the liquid is drained from the space in the vessel under that inserted magnet, whereby the motion speed of the inserted magnet is controlled as it bears down on the permanent magnet lying beneath it. The equipment for carrying out the method may comprise a vessel whose interior cross-section corresponds with clearance to the outline of the assembled permanent magnets, where sockets with regulating valves may be arranged along the height of the vessel, spaced so that their lower edges always lie above the upper surfaces of the assembled permanent magnets, and where all the parts are of non-magnetic material, while the bottom of the vessel may be furnished with a means for exerting an attractive force on the lowered permanent magnets.

13 Claims, 1 Drawing Sheet

OTHER PUBLICATIONS

Richards, David et al., "Commercial Acceptance of Superconducting Magnetic Separation," *Proceedings of the XX IMPC*—Aachen, Sep. 21-26, 1997, pp. 639-648.

Gerber, Richard et al., "High Gradient Magnetic Separation," Research Studies Press, 1983, pp. 36-37 and title page, John Wiley & Sons Ltd.

* cited by examiner

METHOD OF FORMING MAGNETIC BLOCKS AND EQUIPMENT FOR CARRYING OUT THAT METHOD

FIELD OF THE INVENTION

The invention involves a method of forming magnetic blocks from individual permanent magnets or compact magnetic plates, composed of several permanent magnets made of a material whose maximum energy product $(BH)_{max}$ is considerably higher than in ferritic magnets, and equipment for carrying out that method.

DESCRIPTION OF THE PRIOR ART

Magnetic circuits with permanent magnets assembled into large magnetic blocks are used in various branches of industry. A wide application is found for example in the construction of magnetic filters for filtering ceramic casting materials and glazes, in various types of magnetic separators for treating mineralogical raw materials, for the separation of ferromagnetic impurities from various materials (for example, during the treatment of vitreous bodies, plastic materials, waste from auto wreckage treatment) etc. Large magnetic blocks imbedded in those devices were hitherto composed in particular of permanent ferrite magnets, hence of materials with a maximum energy product $(BH)_{max}$ attaining values of about 30 kJ/m$^3$. Up to now the technical process employed for forming these blocks consisted of sealing small unmagnetized ferrite prisms in a casting mould with epoxide resin. After hardening and working the block into the desired shape, magnetization of the whole block then followed, in a magnetic field with sufficiently high intensity.

As noted above, large magnetic blocks are used for example in magnetic filters in the area of ceramic and porcelain manufacturing. Each pole of such a filter consists of one or more large magnetic blocks, arranged in rows. These large magnetic blocks in protective stainless steel cases are imbedded in a closed two-part ferrous circuit, and a tub with plug-in cassette with matrix is inserted into the space between them in the area of a relatively homogeneous magnetic field (in a separating) zone). By inserting the matrix into the space between the magnetic blocks in the tub, a gradient of the magnetic field is created. During passage of the suspension through the separating zone, ferromagnetic particles (e.g. of ferrous abrasion) are caught up by the matrix, whilst unmagnetized particles pass freely through it. The higher the magnetic induction and gradient values attained, the greater is the force operating on the magnetic particles—unlike non-magnetic particles—and the more effective and productive is the magnetic system that can be created (Richards et al., *Commercial acceptance of superconducting magnetic separation*. Proc. of the XX IMPC, Aachen, 1997, p. 641).

The above mentioned simple magnetic filter involves equipment working on the principle of high-gradient magnetic separation (HGMS) in a cyclical, discontinuous mode. In magnetic filtration, it is always necessary to turn off the flow of cleaned suspension for a certain time, depending upon the rate of flow of that suspension and on the content of ferromagnetic impurities, in order to remove the cassette with matrix from the filter and to rinse it in water, outside the magnetic field. One of the basic parameters influencing the technological results achieved in magnetic filtration is the value of magnetic induction in the separating zone of the magnetic filter (Gerber, R. and Birss, R. R., High Gradient Magnetic Separation, Research Studies Press, John Wiley & Sons Ltd., Chichester, 1983, p. 37). The magnetic induction achieved in the separating zone in the filters with ferrite magnets is relatively low. In the case of a magnetic circuit with two opposite large magnetic blocks, each with a ground-plan surface of 0.15×0.1 m and a height of 0.15 m, composed of small ferrite blocks made of a material with maximum energy product $(BH)_{max}$=29 kJ/m$^3$, the magnetic induction in the middle of the air space 0.06 m wide between the covering stainless steel cases of these blocks, attains a value of about 0.2 T, in the case of larger models of filters with several magnetic blocks in each pole, it can be up to 0.23 T.

The development of new, reasonably priced magnets on the basis of rare earth (particularly of the NdFeB type) created the conditions for their application in the magnetic circuits of industrial equipment. Permanent magnets of this type were imbedded in roll magnetic separators of various manufacturers, with magnetic induction values of 1 T attained on the surface of the band around the roller, also in the magnetic systems of drum separators, where the magnetic induction on the surface of the drum attains a value of up to 0.9 T. Besides the other types of magnetic separators (e.g. plate or suspended) magnets of rare earth are used particularly in various types of magnetic gratings and filters, where these magnets are imbedded in gridded bars, inserted into the flow of cleaned raw material. Magnetic induction on the surface of the rods attains in that case a value of 0.6 to 0.7 T.

In all of these devices with magnets of rare earth, a high value of magnetic induction is achieved directly on the surface of the rollers, drums, plates or rods, diminishing rapidly, however, with increasing distance from the surface. In none of the referenced devices is a gradient of the magnetic field created by means of a matrix inserted into a homogeneous magnetic field in a separating zone, as is the case in matrix separators or filters, working on the HGMS principle. The reason lies in the practical problems encountered in creating a strong homogeneous magnetic field in the whole dimension of the separating zone by means of permanent NdFeB magnets. The new types of NdFeB magnets are distinguished by the current, constantly increasing values of maximum energy product attained (at the present time up to ca 420 kJ/m$^3$) and at the same time by their constantly increasing dimensions. Handling them in a magnetized state is therefore considerably more complicated than is the case with ferrite magnets. A precondition for use of these magnets for a given purpose is the identification of a suitable technological process for assembling large magnetic blocks, for their magnetization and for the practical control of the ever greater forces by which the large magnets affect both each other and surrounding ferromagnetic objects. One of the possible solutions to the problem is described in CZ patent application PV 2006-264, where a magnet or magnetic plate moves, during assembly, towards another magnet or plate in a direction parallel to the resulting joint contact surface that is perpendicular to the magnetic flux lines passing through this contact surface.

SUMMARY OF THE INVENTION

The basis of the invention lies in the fact that, during formation of the magnetic blocks, a first permanent magnet is lowered to the bottom of an upwardly open vessel, the vessel is then filled with liquid and, while forcefully maintaining the first permanent magnet in that position, further permanent magnets are gradually inserted into the vessel in a direction perpendicular to their resulting joint contact surfaces, where the adjacent surfaces of the superimposed permanent magnets always have an opposite polarity, whilst during insertion of a further permanent magnet, the liquid is drained from the space in the vessel under that inserted magnet, whereby the motion speed of the inserted magnet is controlled as it bears down on the permanent magnet lying beneath it.

Alternatively, an upwardly open vessel is filled with liquid and a first permanent magnet is then lowered to the bottom whereupon, while forcefully maintaining the first permanent magnet in that position, further permanent magnets are gradually inserted into the vessel in a direction perpendicular to their resulting joint contact surfaces, where the adjacent surfaces of the superimposed permanent magnets always have an opposite polarity, whilst during insertion of a further permanent magnet, the liquid is drained from the space in the vessel under that inserted magnet, whereby the motion speed of the inserted magnet is controlled as it bears down on the permanent magnet lying beneath it. The liquid can be viscous, for example a hydraulic oil. Where the clearance between the walls of the vessel and the permanent magnets or magnetic plates is sufficiently small, the liquid can be water, for example. The first permanent magnet is forcefully maintained in its position by means of the attractive force exerted by an additional outer holding magnet.

The magnets or magnetic plates approach each other at a controlled speed in a direction perpendicular to the resulting joint contact surface that is parallel to the magnetic flux lines passing through that contact surface. By comparison with known procedures, the solution according to this invention makes possible a significant reduction in manpower requirements for assembling the large magnetic blocks, a shortening of the work time needed and increased safety levels, whilst at the same time achieving very good magnetic parameters in the assembled large magnetic blocks.

The subject of the invention is also equipment for carrying out said method, comprising a vessel whose interior cross-section corresponds with clearance to the outline of the assembled permanent magnets, where sockets with regulating valves are arranged along the height of the vessel, spaced so that their lower edges always lie above the upper surfaces of the assembled permanent magnets, and where all the parts are of non-magnetic material, whilst the bottom of the vessel is furnished with a means for exerting an attractive force on the lowered permanent magnets. The means for exerting an attractive force can be an additional holding magnet, fixed outside the bottom of the vessel. The vessel can be furnished with viewing windows for continuous inspection of the position of the lowered permanent magnets.

Practical control of the method for forming magnetic circuits from NdFeB magnets using a method and equipment according to this invention permits the construction of magnetic filters in which it is possible to attain high values of magnetic induction in the separating zone. It involves simple, relatively inexpensive equipment, operating in a discontinuous cyclic mode with regular workforce requirements. Significantly stronger magnetic fields are formed than has been the case so far with the new types of permanent magnets in a larger volume separating zone.

Sockets with regulating valves can be arranged in pairs, both sockets of each pair being arranged at the same height. The tendency for the magnets or magnetic plates to jam in the vessel is thus limited.

The cross-section of the vessel can be in the form of a right-angled parallelogram, while the sockets are arranged in two opposite walls, with the viewing windows located in the other walls.

The permanent magnet can be in the form of a panel whose peripheral frame incorporates several partial permanent magnets. It is thus possible to create large magnetic blocks for industrial use.

The additional holding magnet can be retractably positioned in a clevis, fixed under a work board of non-magnetic material on which the vessel is placed. By use of this additional holding magnet the movement of the first permanent magnet inserted into the vessel is significantly limited.

Shaped non-magnetic plates can be inserted between the walls of the vessel and the permanent magnets to permit the removal of the magnetic block from the vessel, which makes it possible to free the magnets in the vessel in case they get jammed and also facilitates the removal from the vessel of both the individual magnets and the whole magnetic block.

The bottom of the vessel can be furnished with a socket with a valve for draining the liquid.

BRIEF DESCRIPTION OF THE DRAWINGS

The invention will be further explained by an example of one of its many embodiments, by means of the attached drawing and the subsequent detailed description of that preferred embodiment. The drawing shows an example of the equipment according to the invention, in partial cross-section and in top view.

EXAMPLES OF PREFERRED EMBODIMENTS

Figure 1:
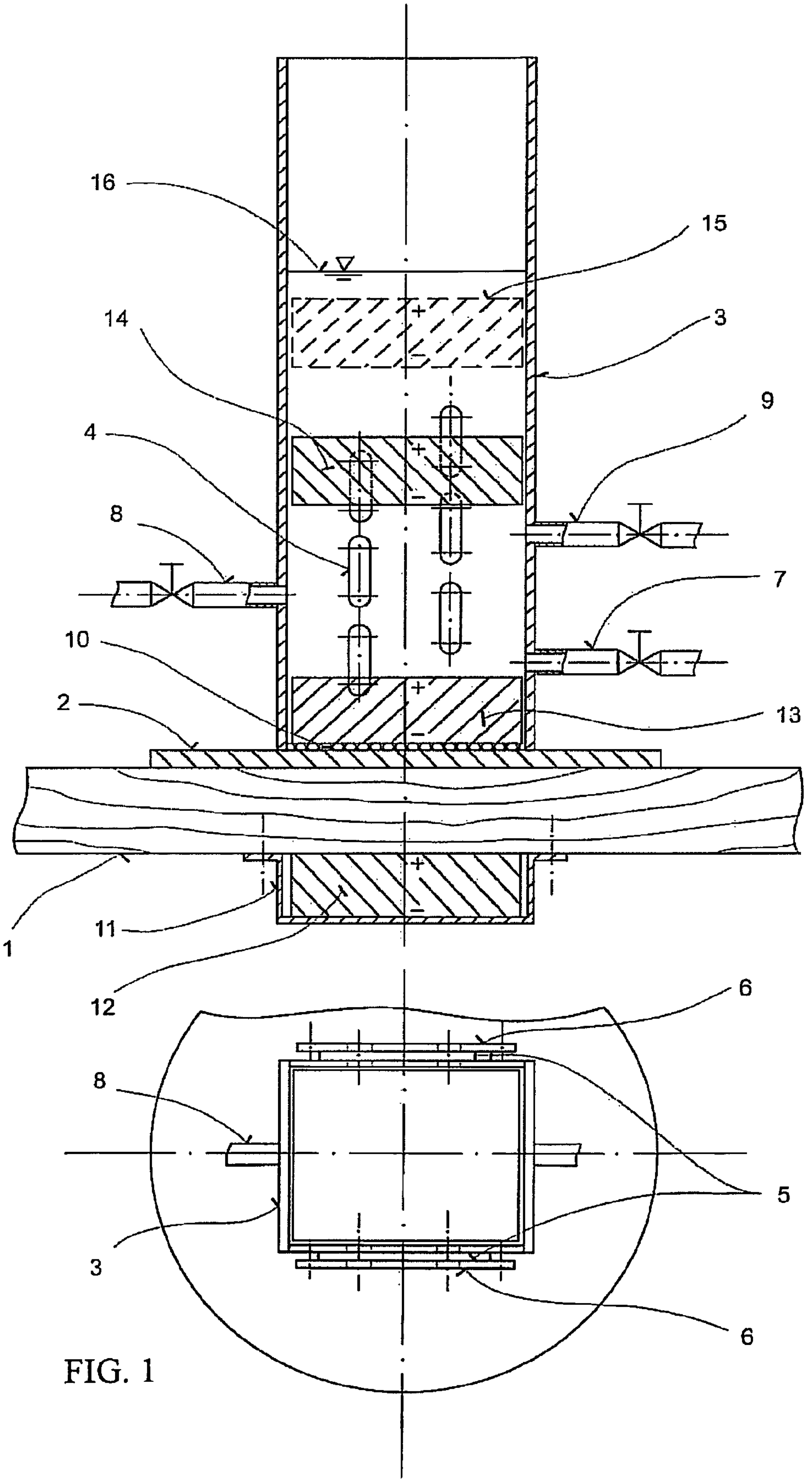

To carry out the method for forming magnetic blocks according to this invention, equipment was designed as shown in FIG. 1. This equipment is arranged on a work board 1 of non-magnetic material, for example wood, and consists of a non-magnetic stainless steel vessel the bottom of which consists of a non-magnetic stainless steel bottom plate 2 to which is welded the vessel housing 3 (tube), also of non-magnetic stainless steel. The interior transverse section of the vessel corresponds to the outer transverse section of the assembled magnets, or of the magnetic plates (FIG. 1 shows in top view a rectangular cross-section, but it can also be square, round etc.). The interior dimensions of the vessel are such that, during formation of the magnetic blocks, free movement is possible of the lowered permanent magnets 13, 14, 15 (magnetic plates) in a vertical direction, with low clearance. In the vessel, in the forward and rear vertical walls, oval viewing openings 4 are provided, covered by viewing covers 5 made of methyl methacrylate. The viewing cover 5 is sealed with respect to the vessel and is attached by a cover plate 6 with oval holes (by means of screws welded to the vessel housing 3). In the lateral vertical walls of the housing 3 round holes are formed, at which welded non-magnetic output sockets of stainless steel (first socket 7, second socket 8, third socket 9) with closing non-magnetic valves are connected to the vessel walls. The altitudinal distance between the individual sockets (between the first and second sockets 7, 8 and between the second and third sockets 8, 9) corresponds to the height of the assembled magnets 13, 14, 15 (or magnetic plates). A clevis 11 with an inserted additional holding magnet 12 (or magnetic plate) is fixed under the work board 1 in a position under the vessel.

Preparation for the actual formation of large magnetic blocks can be carried out by various methods. One of the possibilities is that insertion of the first permanent magnet 13 (or magnetic plate) into the vessel should proceed under circumstances where that first permanent magnet 13 is beyond the effective range of the additional holding magnet 12, that is with the additional holding magnet 12 removed from the clevis 11 or the whole equipment distanced (removed) from the magnet in the clevis 11. The object is that the first permanent magnet 13 should not fall to the bottom of the vessel at too great a speed. To that end, a soft (rubber) pad 10 is inserted into the bottom, preventing damage to the first permanent magnet 13 during free fall onto the bottom of the vessel. After insertion of the first permanent magnet 13 into the vessel, the additional holding magnet 12 is then inserted into the clevis 11, or the equipment is pushed along the work board 1 above the clevis 11 with the additional holding magnet 12. The opposing surfaces of the two magnets 12, 13 after setting in place, must have opposite polarity, as is indicated on the attached drawing (the magnets must attract each other). All the valves on the sockets 7, 8 and 9 must also be closed.

After completing the preparation, the vessel is filled with liquid (e.g. hydraulic oil) up to the level of the liquid 16 line. Then the second permanent magnet 14 (or magnetic plate) is inserted into the vessel so that the contact surface of that magnet should have opposite polarity to that of the contact surface of the first permanent magnet 13 (or magnetic plate). These two magnets 13, 14 (or plates) attract each other. In addition to the viscosity of the liquid used, the speed of this attraction depends first of all on the extent of the clearance between the outer dimensions of the magnets and the inner dimensions of the vessel. Next, the valve on the first socket 7 is opened and the liquid is slowly drained from the space between the two magnets 13 and 14. The position of these magnets and the speed of their attraction can be checked through the oval viewing openings 4 covered by the viewing covers 5. By opening or closing the valve on the first socket 7, it is possible to continuously control this speed of attraction and thus achieve a slow attraction of the magnets 13 and 14 towards each other without them being damaged. After attraction of the two magnets 13 and 14, the valve on the first socket 7 is closed.

By regulating the drainage of the liquid from the vessel, a slow attraction of the magnets 13 and 14 can be achieved despite the fact that, as these magnets 13 and 14 converge, there is a rapid increase in the force by which the magnets are mutually attracted (that force is directly proportional to the square of the magnetic induction in the space between the magnets). The described method of regulating the drainage of liquid from the space under the lowered magnet is only an example, the drainage can also be accomplished by other known methods.

In this connection, the reason for the use of the additional holding magnet 12 should be explained in more detail. Without the use of that magnet 12, at a certain distance between the two magnets the first permanent magnet 13 would move in an upward direction in the vessel, due to the balance of forces acting upon the first permanent magnet 13 during the approach of the second permanent magnet 14. In moving, that magnet would cover the hole of the first socket 7 and the possibility of regulating the drainage of liquid from the vessel would thereby be limited. After settling the additional holding magnet 12 under the work board 1 under the equipment according to this invention, the magnets 12 and 13 exert a mutual attraction (the additional holding magnet 12 "holds" the first permanent magnet 13 on the bottom of the vessel) and the movement of the first permanent magnet 13 in an upward direction during the approach of the second permanent magnet 14 is thus significantly limited.

After assembling the first and second permanent magnets 13 and 14, the liquid is then topped up to the original level 16 and a further permanent magnet (third permanent magnet 15—on the drawing its outline is indicated by a broken line) is introduced into the vessel, again so that the contact surface of the magnet should have an opposite polarity to that of the contact surface of the second permanent magnet 14. After opening the valve on the second socket 8, with the resulting regulating drainage of liquid as in the previous case, a slow attraction of the third permanent magnet 15 towards the already assembled magnets 13 and 14 can be achieved. After the attraction, it is again necessary to close the valve on the second socket 8.

The procedure during attraction of a further permanent magnet, not shown here, to the magnets already assembled is exactly the same as in the previous step. To control the speed of attraction in this case, the valve on the third socket 9 is used.

A magnetic block composed of several permanent magnets or magnetic plates (four in the embodiment described) can thus be assembled with the equipment according to this invention. It is obvious that, by increasing the height of the vessel and by fitting it with a corresponding number of further sockets with valves, it is possible, using the method according to the preceding description, to assemble a large magnetic block with any desired number of magnets or magnetic plates. After completing the assembly of the block it is necessary to remove the additional holding magnet 12 from the clevis 11 and move it from the effective range of the assembled magnetic block, or remove the whole equipment with the composite magnetic block along the work board 1 out of range of the additional holding magnet 12. The liquid is then drained and the completed magnetic block is removed from the vessel to the non-magnetic work board 1. For assembly of dimensionally bigger, industrially scaled large magnetic blocks from individual magnetic plates, a larger embodiment of the equipment according to this invention is required. The example described of an embodiment of the equipment was used for the gradual assembly of individual magnetic plates with ground-plan dimensions of 0.16×0.11 m and a height of 0.03 m into large magnetic blocks of the same ground-plan dimensions and a height of up to 0.12 m. Each plate is composed of six NdFeB magnets with dimensions of 0.05×0.05×0.03 m.

On the lateral walls of the housing 3 (tube) of the vessel, instead of one socket with valve, at a certain height there can be two opposing sockets (symmetrical with respect to the vertical axis of the vessel), both sockets being arranged at the same height. These sockets are connected to a valve through a T fitting, by long hoses of the same length, making it possible to close and regulate the flow of liquid. Through regulating the same flow of liquid from the two symmetrically placed sockets, this embodiment prevents a possible jamming of the magnetic plates, in the course of their mutual attraction, between the walls of the vessel housing 3, as a result of their small height compared to the ground-plan dimensions. A further technical measure against possible jamming is to use thin, shaped metal non-magnetic plates, inserted between the wall of the vessel housing 3 and the actual magnetic plate. The inner dimensions of the vessel are thus greater by this thickness of inserted metal non-magnetic plates. If jamming of a magnetic plate occurs, it is possible, by shifting those additional non-magnetic plates in a vertical direction, to free the magnetic plate. The additional metal non-magnetic plates can be bent into a right-angle in their lower part, thus making it possible, by pulling in an upward direction, to remove both the individual magnetic plates and also the whole large magnetic block from the vessel without needing to turn the whole equipment over.

The equipment can also be furnished in its lower part with a socket with a valve for draining the liquid from the vessel. This solution makes possible a simplified arrangement for assembling the large magnetic blocks described in the preceding embodiment. Before arranging the magnetic block it is possible to set up the whole device on the work board 1, directly above the additional holding magnet 12 in the clevis 11 and to fill the vessel with liquid. After inserting the first permanent magnet 13 (or magnetic plate) into the vessel, it is possible, by controlled draining of the liquid through the draining valve, to slowly lower this magnet onto the bottom of the vessel, as in the assembly of the actual magnetic block. After completing the assembly of the whole magnetic block, it is possible to drain the liquid from the vessel through the draining valve, to remove the additional holding magnet (magnetic plate) 12 from the clevis 11 and to transfer it out of the effective range of the magnetic block. The whole magnetic block can then be removed from the vessel as described above, that is by means of metal non-magnetic plates. The need for handling, shifting or turning over of the actual equipment is thus eliminated.

Example 1

The basic embodiment of the equipment for carrying out the method of forming or assembling large magnetic blocks is illustrated in the attached drawing. The equipment in this embodiment is designed for assembling smaller magnets or magnetic plates into larger blocks and was verified by assembling blocks of individual NdFeB magnets with a maximum energy product $(BH)_{max}$ equal to 350 kJ/$m^3$ and with ground-plan dimensions of 0.5×0.05 m and a height of 0.03 m. This equipment placed on a work board 1 of non-magnetic material (e.g. wood) consists of a vessel the bottom of which consists of a non-magnetic stainless steel bottom plate 2 to which is welded the vessel housing 3 (tube), also of non-magnetic stainless steel. The interior transverse section of the vessel corresponds to the outer transverse section of the assembled magnets, or of the magnetic plates (the drawing shows, in top view, a rectangular cross-section, but it can also be square, round etc.). In the course of assembly, the interior dimensions of the vessel must permit free movement of the inserted magnets 13, 14, 15 (or magnetic plates) in a vertical direction, with low clearance. In the vessel, in the forward and rear vertical walls, oval viewing openings 4 are provided, covered by viewing covers 5. That viewing cover 5 made of methyl methacrylate, is sealed with respect to the vessel and is attached by a cover plate 6 with oval holes, by means of screws, welded to the vessel. In the lateral vertical walls of the vessel, round holes are formed, at which welded non-magnetic stainless steel output sockets 7, 8, 9 with closing non-magnetic valves (or slide valves) are connected to the vessel walls. The altitudinal distance between the individual sockets 7 and 8 and also between sockets 8 and 9 corresponds to the height of the assembled magnets or magnetic plates. A clevis 11 with an inserted additional holding magnet 12 (or magnetic plate) is fixed under the work board 1 in a position under the vessel.

Example 2

For the assembly of dimensionally bigger, industrially scaled large magnetic blocks from individual magnetic plates, a larger embodiment of the above mentioned equipment is required. This embodiment was designed and executed for the gradual assembly of individual magnetic plates with ground-plan dimensions of 0.16×0.11 m and a height of 0.03 m into large magnetic blocks of the same ground-plan dimensions and a height of up to 0.12 m. Each plate is composed of six NdFeB magnets with dimensions of 0.05×0.05×0.03 m. In the lateral walls of the vessel, instead of one socket with valve or slide valve, at a certain height from the bottom there are two opposing sockets, symmetrical with respect to the vertical axis of the vessel, both sockets being arranged at the same height. The sockets are connected to a slide valve or valve, through a T fitting, by long hoses of the same length, making it possible to close and regulate the flow of liquid, hydraulic oil. Through regulation, this solution makes it possible to attain the same flow of hydraulic oil from the two symmetrically placed sockets and limits the tendency of the magnetic plates to jam, in the course of their mutual attraction, between the walls of the vessel (as a result of their small height compared to the ground-plan dimensions).

A further technical measure against possible jamming is to use thin shaped metal non-magnetic plates, inserted between the walls of the vessel and the actual magnetic plate. The inner dimensions of the vessel are thus greater by this thickness of metal plate. If jamming of a magnetic plate occurs, it is possible, by shifting those additional metal non-magnetic plates in a vertical direction, to free the magnetic plate. These additional metal non-magnetic plates can be bent into a right-angle in their lower part, thus making it possible, by pulling in an upward direction beyond the two opposite plates, to remove both the individual magnetic plates and, in particular, the whole large magnetic block from the vessel without turning the whole equipment over.

The equipment can also be furnished in the lower part with a socket with slide valve or valve for draining the oil. This solution makes possible a simplified arrangement for assembling the large magnetic blocks described in the preceding Example 1. Before arranging the magnetic blocks it is possible to set up the whole equipment on the work board 1, directly above the additional holding magnet (or magnetic plate) 12 in the clevis 11 and to fill the vessel with oil. After inserting the first permanent magnet (or magnetic plate) 13 into the vessel, it is possible, by controlled draining of the oil through the draining valve, to slowly lower this plate onto the bottom of the vessel, as in the assembly of the actual magnetic block. After completing the assembly of the whole magnetic block, it is possible to drain the oil from the vessel through the draining valve, to remove the additional holding magnet (magnetic plate) 12 from the clevis 11 and to transfer it out of the effective range of the magnetic block. The whole magnetic block can then be removed from the vessel by the method described above, by means of the metal non-magnetic plates. The need for handling, shifting or turning over of the actual equipment is thus eliminated.

Industrial Use

The invention can be used, for example, for maintenance free magnetic filters in the manufacture of ceramics and porcelain, which work in an automatic cycle mode and which, by comparison with electromagnets, are considerably less exacting in investment and operational terms. The technique of forming large magnetic blocks from NdFeB material with high $(BH)_{max}$ and assembling those blocks into a greater area of poles, can be used in magnetic systems of plate or belt separators, suspended over conveyer belts. These separators are used for separating ferromagnetic objects from various materials, for example glass shards, plastic etc., to protect technical equipment against damage. Given the higher magnetic induction values achieved in the separation zone, there is a significant increase in the effectiveness of the grading. A further use for this invention is in the periphery of continual magnetic separators with permanent magnets in magnetic filtration and enrichment of raw materials. In this case also, by using NdFeB magnets, a much higher magnetic induction is achieved in the separating zone, by comparison with ferrite magnets, which has a positive effect on the results of magnetic separation, without making demands on electric energy consumption, given the use of permanent magnets.

LIST OF REFERENCE NUMERALS

1 . . . work board
2 . . . bottom plate of vessel
3 . . . vessel housing (tube)
4 . . . viewing openings
5 . . . viewing cover
6 . . . cover plate
7 . . . first socket
8 . . . second socket
9 . . . third socket
10 . . . pad
11 . . . clevis
12 . . . additional holding magnet
13 . . . first permanent magnet
14 . . . second permanent magnet
15 . . . third permanent magnet
16 . . . level of liquid

The invention claimed is:

1. A method of forming magnetic blocks, wherein a first permanent magnet is lowered to the bottom of an upwardly open vessel, the vessel is then filled with liquid and, while forcefully maintaining the first permanent magnet (13) in that position, further permanent magnets are gradually inserted into the vessel in a direction perpendicular to their resulting joint contact surfaces, where the adjacent surfaces of the superimposed permanent magnets always have an opposite polarity, while during insertion of a further permanent magnet, the liquid is drained from the space in the vessel under that inserted magnet, whereby the motion speed of the inserted magnet is controlled as it bears down on the permanent magnet lying beneath it.

2. A method of forming magnetic blocks according to claim 1, wherein the upwardly open vessel is first filled with liquid and the first permanent magnet is then lowered to the bottom.

3. A method of forming magnetic blocks according to claim 1, wherein the liquid is viscous, for example a hydraulic oil.

4. A method of forming magnetic blocks according to claim 1, wherein the first permanent magnet is forcefully maintained in its position by means of the attractive force exerted by an additional outer holding magnet.

5. Equipment for carrying out the method according to claim 1, wherein the upwardly open vessel has an interior cross-section which corresponds with clearance to the outline of the assembled permanent magnets, where sockets with regulating valves are arranged along the height of the vessel, spaced so that their lower edges always lie above the upper surfaces of the assembled permanent magnets, and where all the parts are of non-magnetic material, while the bottom of the vessel is furnished with a means for exerting an attractive force on the lowered permanent magnets.

6. Equipment according to claim 5, wherein, the means for exerting an attractive force is an additional holding magnet, fixed outside the bottom of the vessel.

7. Equipment according to claim 5, wherein the vessel is furnished with viewing windows for continuous inspection of the position of the lowered permanent magnets.

8. Equipment according to claim 5, wherein sockets with regulating valves are arranged in pairs, both sockets of each pair being arranged at the same height.

9. Equipment according to claim 5, wherein the cross-section of the vessel is in the form of a right-angled parallelogram, while the sockets are arranged in two opposite walls, with the viewing windows located in the other walls.

10. Equipment according to claim 9, wherein, the permanent magnet is in the form of a panel whose peripheral frame incorporates several partial permanent magnets.

11. Equipment according to claim 6, wherein the additional holding magnet is retractably positioned in a clevis, fixed under a work board of non-magnetic material on which the vessel is placed.

12. Equipment according to claim 5, wherein shaped non-magnetic plates are inserted between the walls of the vessel and the permanent magnets, to permit the removal of the magnetic block from the vessel.

13. Equipment according to claim 5, wherein the bottom of the vessel is furnished with a socket with a valve for draining the liquid.

* * * * *